United States Patent
Gill et al.

(10) Patent No.: US 11,511,331 B2
(45) Date of Patent: Nov. 29, 2022

(54) DIE STACKER

(71) Applicant: Express Products, Inc., Grandville, MI (US)

(72) Inventors: Dennis G. Gill, Grand Rapids, MI (US); Paul A. Carver, Byron Center, MI (US)

(73) Assignee: Express Products, Inc., Grandville, MI (US)

( * ) Notice: Subject to any disclaimer, the term of this patent is extended or adjusted under 35 U.S.C. 154(b) by 0 days.

(21) Appl. No.: 16/718,966

(22) Filed: Dec. 18, 2019

(65) Prior Publication Data

US 2021/0187584 A1 Jun. 24, 2021

(51) Int. Cl.
| | |
|---|---|
| B21D 37/10 | (2006.01) |
| B21D 22/06 | (2006.01) |
| B21D 37/14 | (2006.01) |
| B65G 1/00 | (2006.01) |
| B65G 1/14 | (2006.01) |

(52) U.S. Cl.
CPC ............ B21D 37/10 (2013.01); B21D 22/06 (2013.01); B21D 37/14 (2013.01); B65G 1/00 (2013.01); B65G 1/14 (2013.01)

(58) Field of Classification Search
CPC ........ B21D 37/10; B21D 37/14; B21D 22/06; B65G 1/00; B65G 1/14
See application file for complete search history.

(56) References Cited

U.S. PATENT DOCUMENTS

| | | | | |
|---|---|---|---|---|
| 2,225,145 | A * | 12/1940 | Baumbach | B21D 37/10 384/13 |
| 2,379,271 | A * | 6/1945 | Bechtel | B21D 28/26 83/637 |
| 2,445,574 | A * | 7/1948 | Grunow | F16B 9/054 83/637 |
| 3,125,917 | A * | 3/1964 | Smeets | B21D 28/26 83/140 |
| 3,140,630 | A * | 7/1964 | Wolf | B21D 45/006 83/140 |
| 3,496,818 | A * | 2/1970 | Porter | B21D 37/10 83/140 |
| 3,574,922 | A * | 4/1971 | Eppich | B21D 37/10 29/465 |
| 3,673,902 | A * | 7/1972 | Strobel | B21D 37/10 83/133 |
| 3,733,671 | A * | 5/1973 | Strobel | B21D 28/34 29/281.4 |
| 3,848,452 | A * | 11/1974 | Gargrave | B21D 43/023 72/448 |

(Continued)

FOREIGN PATENT DOCUMENTS

JP 59223120 A * 12/1984 ............ B21D 37/10

*Primary Examiner* — Stanton L Krycinski
(74) *Attorney, Agent, or Firm* — Mitchell Intellectual Property Law, PLLC

(57) ABSTRACT

A die stacker for stacking stamping dies has a supporting base, an attachment stem projecting upwardly from said base for insertion into the slot of a slotted foot of a die, and a clamp moveably mounted on said stem which can be moved into or out of clamping engagement with a slotted die foot. Several such die stackers are attached to a die to support the die in a stack or on the floor with the die spaced above the floor.

14 Claims, 4 Drawing Sheets

(56) References Cited

U.S. PATENT DOCUMENTS

| | | | | |
|---|---|---|---|---|
| 4,103,574 A * | 8/1978 | Greer | ............. | B21D 28/34 |
| | | | | 279/24 |
| 4,656,902 A * | 4/1987 | Vrignaud | ............. | B21D 28/26 |
| | | | | 83/130 |
| 4,703,644 A * | 11/1987 | Waldner | ............. | B21D 37/10 |
| | | | | 100/917 |
| 4,805,440 A * | 2/1989 | Lenders | ............. | B21D 28/14 |
| | | | | 100/214 |
| 8,316,686 B2 * | 11/2012 | Summers | ............. | B21D 37/16 |
| | | | | 72/466.9 |
| 2003/0005802 A1 * | 1/2003 | Kyono | ............. | B21D 37/10 |
| | | | | 83/531 |
| 2003/0106400 A1 * | 6/2003 | Lyons | ............. | B21D 28/14 |
| | | | | 83/13 |

* cited by examiner

DIE STACKER

FIELD AND BACKGROUND OF THE INVENTION

The present invention relates to the field of stamping dies. Stamping dies is a one-of-a-kind precision tool that when placed in a stamping press cuts and forms sheet metal into a desired shape or profile. Stamping dies such as stamping die 1 shown in FIG. 5, are very heavy and typically comprise a base plate or shoe 2 having a plurality of shaping and/or cutting members 3 spaced appropriately on base plate 2.

Base plate 2 is rigidified by several "parallels" 4 on the bottom of plate 2. Some of the parallels include slots 5 in their ends. These parallels are called "footed parallels" since they serve as feet for mounting the die to the stamping press. The slotted ends 4a are sometimes called "slotted feet," or a "slotted foot." The base plate can also be slotted for press attachment, similar to a slotted foot.

The dies are very heavy and are usually handled with a high-low. When not in use, the dies are typically placed on boards to keep them off of the concrete factory floor, or on boards between successively stacked dies. Dies are often stacked as many as 8 in a stack.

SUMMARY OF THE INVENTION

The present invention is a method and device for stacking stamping dies. A die stacker is provided which has a supporting base, an attachment stem projecting upwardly from said base for insertion into the slot of a slotted foot of a die or baseplate slot, and a clamp moveably mounted on said stem which can be moved into or out of clamping engagement with the slotted die foot. Several such die stackers can be attached to a die to support, said die above the factory floor and in stacks above other dies, when the assembly of the die and stackers is placed on the floor or stacked above other dies.

These and other objects, advantages and features of the invention will be more fully understood and appreciated by reference to the Description of the Preferred Embodiments and appended drawings.

DESCRIPTION OF THE PREFERRED EMBODIMENTS

Figure 3:
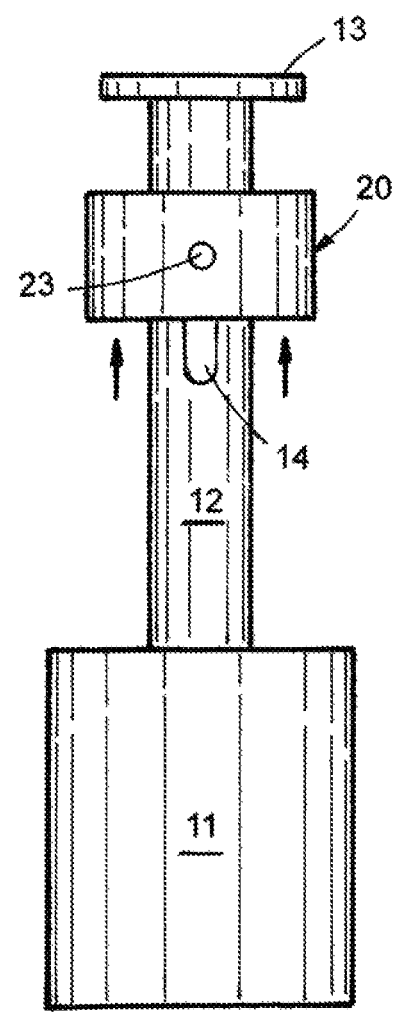
FIG. 3 is a side elevation of the die stacker.

The Die stacker 10 of the preferred embodiment includes a base 11 from which a stem 12 projects upwardly (FIGS. 1-4). A spring-loaded clamp 20 slides up and down on stem 12 between a lower clamping position (FIG. 2) and an upper stacker release and manipulating position (FIG. 3).

Figure 1:
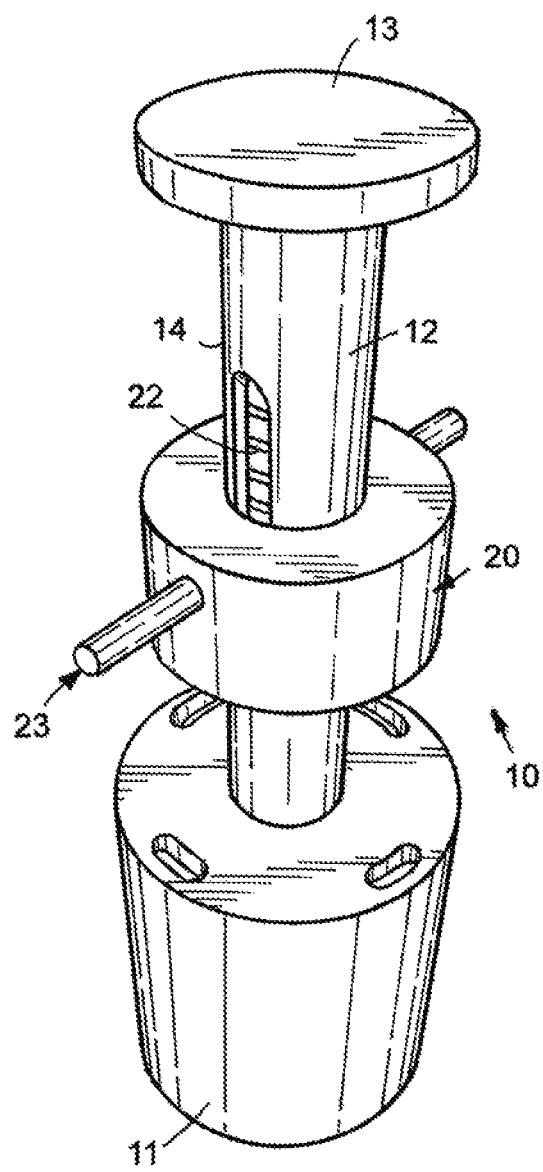
FIG. 1 is a perspective view of a preferred embodiment die stacker.
Figure 2:
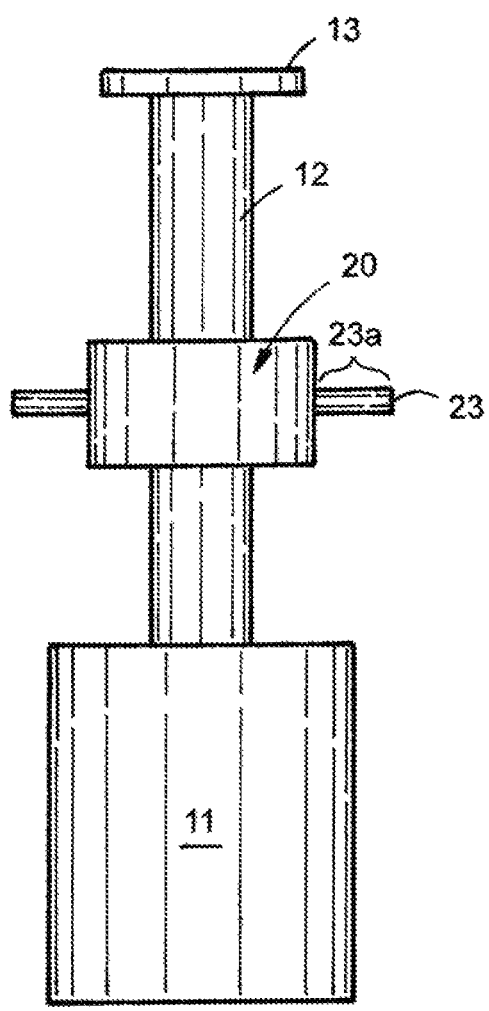
FIG. 2 is a front elevation of the die stacker.
Figure 4:
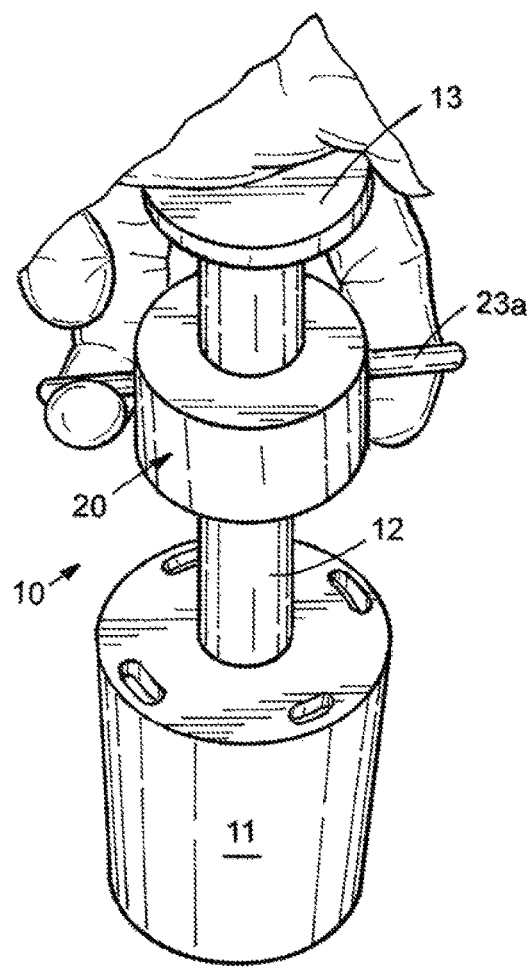
FIG. 4 is a perspective view of a preferred embodiment die stacker being manipulated for attachment to a slotted die foot.
Figure 6:
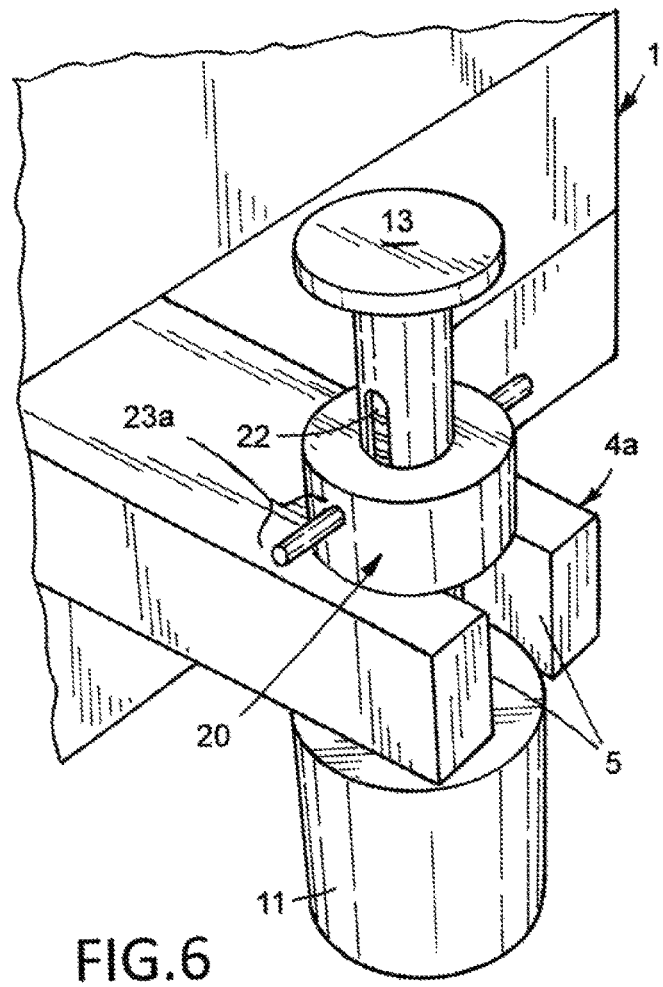
FIG. 6 is an enlarged view of the circled area VI of FIG. 5.
Figure 5:
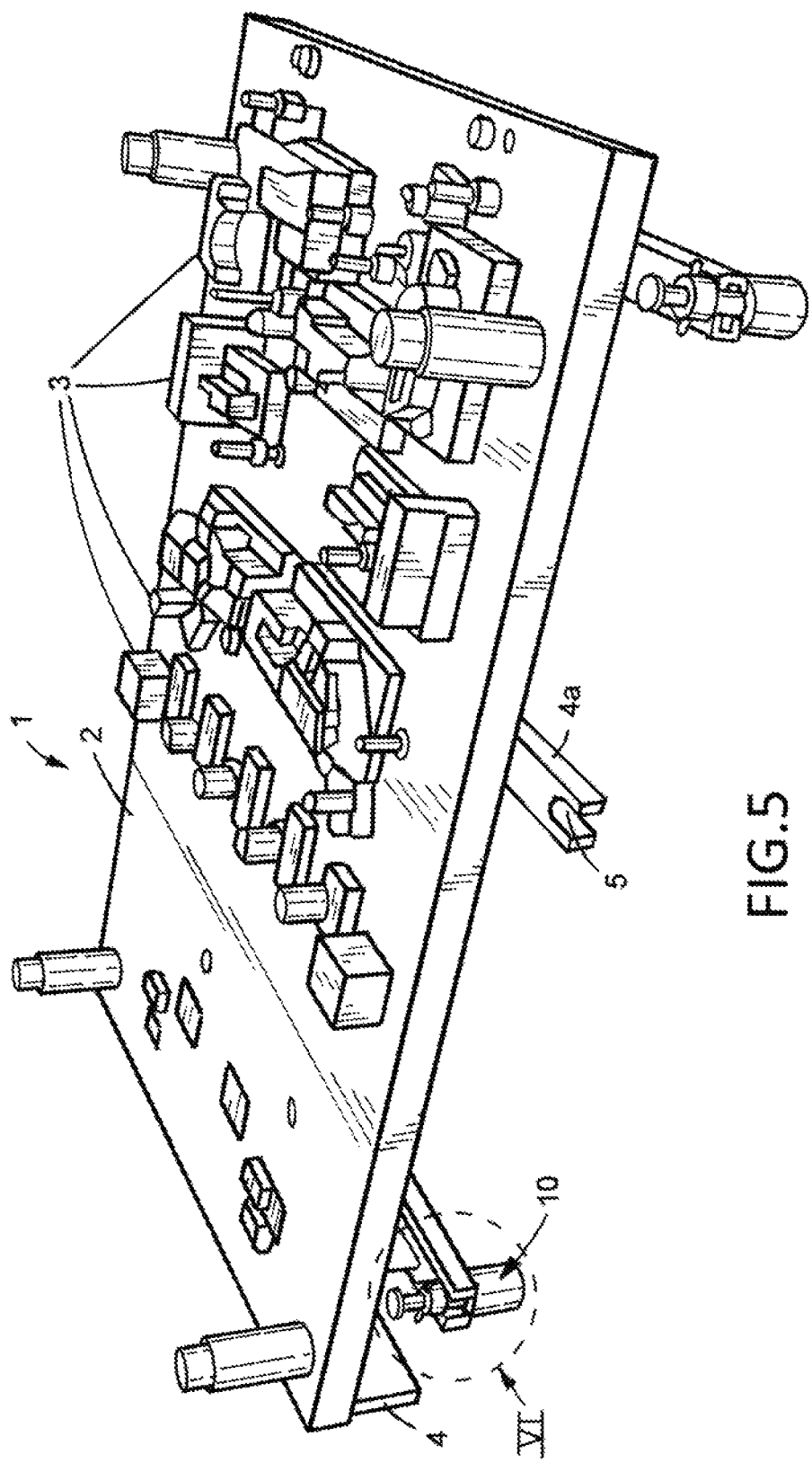
FIG. 5 is a perspective view of a stamping die with a die stacker attached to a slotted foot.

There is a butt plate 13 at the top of stem 12, for engagement by the butt of a user's thumb. Stem 12 itself is hollow and includes a biasing spring 22 located within the hollow interior of stem 12 (FIGS. 1 and 6). Clamp 20 includes a spring stop pin 23 which extends through clamp 20 and through stem 12 from one side to the other. Spring 22 is thus trapped within the interior of stem 12 between the underside of butt plate 13 and spring stop pin 23 passing through stem 12. A slot 14 on each of the opposite sides of stem 12 allows stop pin 23 and clamp 20 through which it extends to slide up and down on stem 12. Spring 22 is sufficiently strong to bias clamp 20 into clamping engagement with a slotted die foot 4a. The ends of stop pin 23 which extend beyond the perimeter of clamp 20 serve as finger grips 23a. A user can manually manipulate die stacker 10 by positioning two fingers on finger grips 23 and the butt of his or her thumb on butt plate 13 at the top of stem 12. By squeezing the user can thus draw clamp 20 upwardly on stem 12 (FIG. 4). The user can then locate die stacker 10 in a slot in slotted foot 4a and then release the pressure on spring 22 which biases clamp 20 downwardly into engagement with the top of die foot 4a. Die foot 4a is thus trapped between die stacker base 11 and clamp 20, such that die stacker 10 remains attached to die foot 4a.

Die Stacker 10 is preferably made of a heavy-duty material, such as a heavy-duty plastic, aluminum or steel. Steel is most preferred. Base 11 is tall enough to keep a supported die elevated above the factory floor or above a lower die upon which it is stacked. It must also be sufficiently tall that it provides spacing for the shaping and cutting members 3 of a die 1 upon which it may be stacked. It must be wide enough to provide ample clamping surface against the bottom of a die foot 4a and provide a stable support platform for a die 1.

A height of 2 to 5 inches is typically sufficient, with about 3.5 inches being preferred. A diameter of 2.5-3.5 inches is typically sufficient for width, with about 3 inches diameter being preferred. For economical and weight minimization purposes, base 11 is hollow, comprising a cylinder with a wall thickness of about 0.5 inches and a top cover or wall about 0.250 thick. Other variations could be solid for maximizing strength.

Stem 12 is dimensioned in diameter and length to fit within said slot of a slotted die foot with said base of said die located below said die foot and said clamp located above and out of engagement with said die foot to facilitate insertion of said stem into said slotted foot, for subsequent lowering of said clamp into clamping engagement with the top of said die foot. In this embodiment, stem 12 is a tube having a ¾ inch inner diameter, and a ½ to 1½ inch outer diameter, with 1 inch being preferred. Stem 12 is 4-7 inches tall, preferably 5-6 inches tall.

Each of the opposed slots 14 in stem 12 is wide enough to accommodate said stop pin and is long enough to ensure that in its lowered position, said clamp 20 engages the top of die foot 4a when base 11 engages the bottom thereof. It must also be sufficiently long to ensure that said clamp can be lifted out of engagement with the top of a die foot 4a. Finally, the top of each of said slots should be spaced sufficiently close to said butt plate 13 that a user can conveniently compress said biasing spring 22 between the butt of the user's thumb and the user's fingers engaging said finger grips 23a.

Thus slots 14 should typically be about ¼ to ½ inch wide and about 2 to 2½ inches long. Each slot extends to within about an inch of butt plate 13. Clamp ring 20 has an inner diameter just slightly larger than the outer diameter of stem 12, so that it is slides on it, but is not a sloppy fit. For a 1-inch diameter stem, clamp ring 20 would have an inner diameter of 1.02 to 1.03 inches. Its outer diameter is sufficient to give it a good clamping surface against die foot 4a. About 2-3 inches in outer diameter is preferred, with 2¼ inch preferred. Clamp ring 20 is sufficiently tall to give it strength, and to provide space above and below the level of pin 23, but not so long as to require a longer stem 12. About 1 inch to 2 inches is preferred, with a height of 1¼ inch being preferred.

Pin 23 is of sufficient thickness and strength to act against spring 22 without bending. A ¼ to ½ inch diameter pin is preferred, with ¼ inch being most preferred. Pin 23 is sufficiently long to extend completely through stem 12 and clamp 20, and about ½ to about 1 inch beyond on each side of clamp 20, with about ¾ inch being preferred. Thus, for a 2¼ inch diameter clamp ring, pin 23 would preferably be 3¾ inch long.

In use, a new die 1 or a die 1 removed from a stamping press would be held aloft, e.g. by a high-low, and a user would place a die stacker 10 on at least 3 or 4 spaced slotted die feet 4a, two spaced feet on one side of said die and 1 or 2 on the opposite side of the die. The user would manipulate each die stacker 10 by placing the butt of his or her thumb atop stem butt plate 13, wrap two fingers around the two ends 23a of pin 23, and squeeze, to thereby draw clamp ring 20 upwardly against the bias of spring 22. He or she would then place the exposed length of stem 12 into the slot 5 in the end of a foot 4a, with base 11 of die stacker 10 located on the underside of die foot 4a, and clamp ring 20 located above die foot 4a. He or she would then release the compression pressure on spring 22, such that spring 22 would force clamp 20 downwardly into engagement with the top of foot 4a and draw base 11 upwardly into engagement with the bottom of foot 4a. The user would place at least four die stackers 10 on at least four die feet 4a as described above. The die 1 and the several die stackers 10 attached to it would then be lowered to the floor or to the top of another die for stacking in a multiple die stack.

Figure 7:
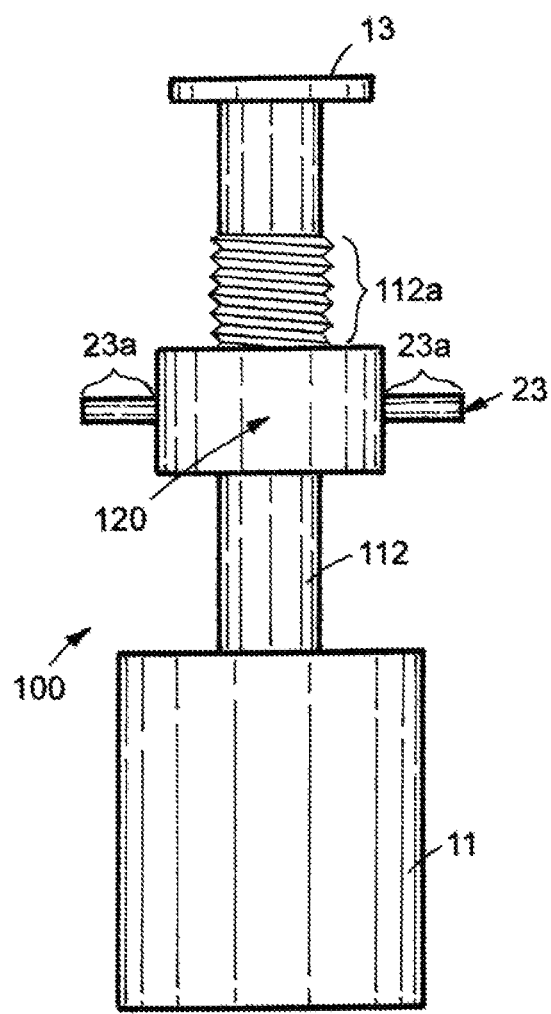
FIG. 7 is a front elevational view of an alternative embodiment die stacker.

FIG. 7 discloses an alternative embodiment die stacker 100. All of the components are the same as those of die stacker 10, except that stem 112 is threaded (112a), and clamp 120 is internally threaded to match threads 112a. The procedure for using die stackers 100 is thus similar to that described above, except that clamp 120 is rotated about stem 112 to thread it upwardly out of clamping engagement with a die foot 4a, or downwardly into clamping engagement with die foot 4a.

Of course, it is understood that the foregoing are descriptions of the preferred embodiments and that various changes and alterations can be made without departing from the scope and spirit of the invention, as set forth in the appended claims, as interpreted in accordance with the Doctrine of Equivalents.

The invention claimed is:

1. A die stacker for stacking stamping dies having slotted die feet for mounting in a stamping press, said die stacker comprising: a supporting base, an attachment stem projecting upwardly from said base for insertion into the slot of a slotted die foot, and a clamp moveably mounted on said attachment stem above said base; said attachment stem being dimensioned in diameter and length to fit within said slot of a slotted die foot with when said base of said die stacker is located below said die foot and said clamp is moved on said attachment stem to a position located above and out of engagement with said die foot to facilitate insertion of said attachment stem into said slot of said slotted die foot, for subsequent lowering of said clamp into clamping engagement with the top of said die foot.

2. The die stacker of claim 1 in which: said clamp is spring biased towards clamping engagement with the slotted die foot.

3. A die stacker for stacking stamping dies having slotted die feet for mounting in a stamping press, said die stacker comprising: a supporting base, an attachment stem projecting upwardly from said base for insertion into the slot of a slotted die foot and a clamp moveably mounted on said attachment stem above said base; said attachment stem being dimensioned in diameter and length to fit within said slot of a slotted die foot with when said base of said die stacker is located below said die foot and said clamp is moved on said attachment stem to a position located above and out of engagement with said die foot to facilitate insertion of said attachment stein into said slot of said slotted die foot, for subsequent lowering of said clamp into clamping engagement with the top of said die foot; said clamp being spring biased towards clamping engagement with the slotted die foot by said attachment stem having a top and a hollow interior below said top; a biasing spring located within said hollow interior of said attachment stem; a portion of said clamp extending laterally into said hollow interior of said attachment stem through at least one vertical slot in said attachment stem; said biasing spring extending between said top of said attachment stem at the top of said biasing spring and said portion of said clamp extending into said hollow interior of said attachment stem at the bottom of said biasing spring, whereby said clamp can be raised upwardly by applying squeezing pressure to said biasing spring between said top of said attachment stem and said clamp.

4. The die stacker of claim 3 in which; said top of said attachment stem comprises a butt plate for engagement by the butt of a user's thumb; said portion of said clamp extending laterally into said hollow interior of said attachment stem through at least one vertical slot in said attachment stem comprising a finger grip extending from opposite sides of said clamp into said hollow interior of said attachment stem where said finger grip is engaged by said biasing spring, and whereby said clamp can be raised by a user positioning two fingers on said finger grip, one finger on each side of said clamp, and the butt, of the user's thumb on said butt plate and squeezing to apply said squeezing pressure to said biasing spring.

5. The die stacker of claim 4 in which: said finger grip portion of said clamp extending into said hollow interior of said attachment stem comprises a spring stop pin which extends through said clamp and through said at least one vertical slot into said hollow interior of said attachment stem, said attachment stem including a second vertical slot opposite said at least one vertical slot, said spring stop pin extending out of said hollow interior of said attachment stem through said second vertical slot and into and through said clamp; said finger grips on opposite sides of said clamp comprising said spring stop pin which is engaged by said bottom of said biasing spring, and which has portions which extend through and beyond said opposite sides of said clamp, to define said finger grips.

6. The die stacker of claim 5 in which: said base is tall enough to keep the supported die elevated above a floor or above a lower die upon which it is stacked, and sufficiently wide to provide ample clamping surface against the bottom of the die foot and provide a stable support platform for a die.

7. The die stacker of claim 6 in which: each of said opposed slots are wide enough to accommodate said stop pin and long enough to ensure that in a lowered position, said clamp engages the top of the die foot when said base engages the bottom of the die foot, and sufficiently long to ensure that said clamp can be lifted out of engagement with the top of the die foot.

8. The die stacker of claim 7 in which the top of each of said slots is spaced sufficiently close to said butt plate that a user can conveniently compress said biasing spring between the butt of the user's thumb and the user's fingers engaging said finger grips.

9. The die stacker of claim 8 in which: said base is from about 2 to about 5 inches in height and from about 2.5 to about 3.5 inches wide; said attachment stem is a tube having a ½ to 1½ inch outer diameter, and is 4 to 7 inches tall; each of said slots is about ¼ to ½ inch wide and about 2 to ½ inches long, and extends to within about an inch of said butt plate; said clamp is about 2 to 3 inches in outer diameter and has a height of about 1 inch to 2 inches; said stop pin has a ¼ to ½ inch diameter and a length extending about ½ to about 1 inch beyond each side of said clamp.

10. The die stacker of claim 1 in which: said attachment stem is threaded, and said clamp is moveable by being internally threaded to match said threads on said attachment stem.

11. A method of stacking dies comprising: providing a die stacker for stacking stamping dies having slotted die feet for mounting in a stamping press, said die stacker comprising: a supporting base, an attachment stem projecting upwardly from said base for insertion into the slot of a slotted die foot, and a clamp moveably mounted on said attachment stem above said base: said attachment stem being dimensioned in diameter and length to fit within said slot of a slotted die foot with when said base of said die stacker is located below said die foot and said clamp is moved on said attachment stem to a position located above and out of engagement with said die foot to facilitate insertion of said attachment stem into said slot of said slotted die foot, for subsequent lowering of said clamp into clamping engagement with the top of said die foot; said method further comprising: placing at least three of said die stackers on two spaced slotted die feet on one side of a die and one slotted die foot on the opposite side of the die, by positioning each said die stacker with its said base located below said die foot and moving said clamp on said attachment stem to a position located above and out of engagement with said die foot; moving said attachment stem of said die stacker into said slot on said slotted die foot, and lowering said clamp into clamping engagement with the top of said die foot.

12. The method of claim 11 in which each said provided die stacker also is spring biased towards engagement with the slotted die foot; said attachment stem having a top and a hollow interior below said stop; a biasing spring located within said hollow interior of said attachment stem; a portion of said clamp extending laterally into said hollow interior of said attachment stem through at least one vertical slot in said attachment stem: said biasing spring extending between said top of said attachment stem at the top of said biasing spring and said portion of said clamp extending into said hollow interior of said attachment stem at the bottom of said biasing spring whereby said clamp can be raised upwardly by applying squeezing pressure to said biasing spring between said top of said attachment stem and said clamp:

said method further comprising on a slotted die foot by applying compression pressure between said top of said attachment stem and said clamp to thereby draw said clamp upwardly against the bias of said spring; then placing the exposed length of said attachment stem into the slot in the end of the slotted die foot with said base of said die stacker located on the underside of said die foot; then releasing the compression pressure on said spring, such that said spring forces said clamp downwardly into engagement with the top of the die foot and draws said base upwardly into engagement with the bottom of said die foot.

13. The method of claim 11 in which each said provided die stacker has an attachment stem which is threaded, and said clamp is moveable on said attachment stem by being internally threaded to match said threads on said attachment stem, said method step of placing said three die stackers is accomplished by placing each said die stacker on a slotted die foot by threading said clamping ring upwardly; then placing the exposed length of said attachment stem into the slot in the end of a slotted die foot with said base located on the underside of said die foot and said clamp ring located above said die foot; then threading said clamp downwardly into engagement with the top of a die foot and drawing said base upwardly into engagement with the bottom of said die foot.

14. The method of claim 12 in which said top of said attachment stem of each said provided die stacker comprises a butt plate for engagement by the butt of a user's thumb; said clamp including a finger grip extending from opposite sides of said clamp, whereby said clamp can be raised by a user positioning two fingers on finger grips and the butt of the user's thumb on said butt plate;

said method of applying compression pressure in placing each said die stacker on a slotted die foot is accomplished by placing the butt of the thumb atop said attachment stem butt plate, wrapping two fingers around said finger grips and squeezing, to thereby draw said clamp upwardly against the bias of said spring; then placing the exposed length of said attachment stem into the slot in the end of a slotted die foot with said base located on the underside of said die foot and said clamp located above said die foot; then releasing the compression pressure on said spring, such that said spring forces said clamp downwardly into engagement with the top of a die foot and draws said base, upwardly into engagement with the bottom of said die foot.

\* \* \* \* \*